United States Patent

[11] 3,631,747

[72] Inventor Eugene Frank Flor
 Pinole, Calif.
[21] Appl. No. 21,423
[22] Filed Mar. 20, 1970
[45] Patented Jan. 4, 1972
[73] Assignee Grove Valve and Regulator Company
 Oakland, Calif.

[54] STUD DRIVER
 2 Claims, 4 Drawing Figs.
[52] U.S. Cl. .................................................. 81/64
[51] Int. Cl. ............................................. B25b 13/52
[50] Field of Search ........................................ 81/64, 53.2,
 4.2; 145/61.12, 61.11

[56] References Cited
 UNITED STATES PATENTS
2,701,491 2/1955 Ross ............................ 81/64
3,025,734 3/1962 Ash ............................. 81/64 UX
1,721,065 7/1929 Bodmer ....................... 145/61.1 UX Primary Examiner—James L. Jones, Jr.
Attorney—Melvin R. Stidham ABSTRACT: A driver for a threaded stud comprising a thick-walled circular receptacle of rubber or the like with an internal diameter to fit snugly over a stud and with coupling means adapting it to be driven by a rotary driving member. The driver threads a stud inward by frictional engagement and, when the stud is placed, the driver may simply be pried free of the stud, the receptacle walls being resilient enough to disengage from the stud.

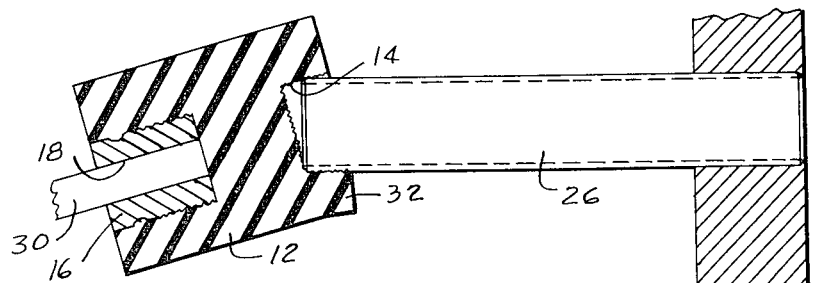
FIG-4-
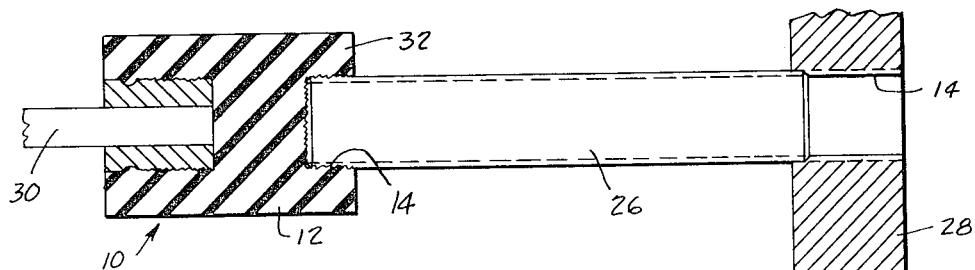
FIG-3-
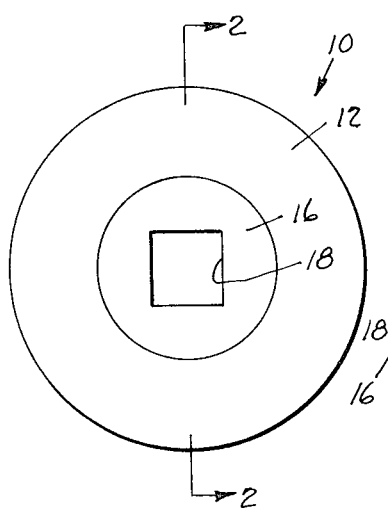
FIG-1
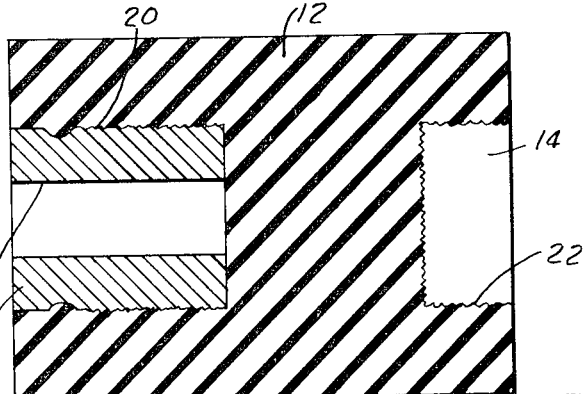
FIG-2-
INVENTOR.
EUGENE FRANK FLOR
BY *Melvin R. Stidham*
ATTORNEY

STUD DRIVER

BACKGROUND OF THE INVENTION

This application relates to a stud driver, and more particularly, to a stud driver that operates solely through frictional engagement.

Present stud drivers grip a stud positively by threading it on to one end. Hence, as the stud is driven into the tapped hole, its threaded connection with the stud driver is tightened. Then, when it is desired to release the stud driver by reversing it, the threaded engagement may be firm enough that it retains a positive grip on the stud, whereby the reverse rotation tends to back the stud off from the desired depth of insertion. As a result, it has been found necessary to grip the stud with a wrench or pliers to hold it in place until the stud driver is threaded free of engagement. In addition, on large size studs of one inch diameter and larger, often used in metal fabrication work, it is necessary to use two men, one to operate the stud driver, and the other to grip the stud with a wrench so that the stud driver may be reversed when the stud has been fully driven. Also when driving larger stud sizes, the stud drivers, which are normally made of steel, become extremely heavy and difficult to handle, particularly when held on the end of a portable power wrench.

OBJECTS OF THE INVENTION

It is, therefore, an object of the invention to provide a stud driver which is relatively light in weight.

It is a further object of this invention to provide a stud driver that may be disengaged from the stud without backing the stud from its depth of insertion.

It is a further object of this invention to provide a stud driver that may be operated by one person in all ranges of stud sizes.

It is a further object of this invention to provide a stud driver that may be disengaged from the stud simply by twisting it off.

Other objects and advantages of this invention will become apparent from the description to follow when read in conjunction with the accompanying drawing.

BRIEF DESCRIPTION OF THE INVENTION

In carrying out this invention, there is provided a body of rubber or the like, having therein a rigid coupling element that adapts it for connection with a complementary element of a power wrench or tool or similar rotary driving device. At one end of the body is a circular receptacle that is of a diameter to fit snugly over a stud. The walls of the cylinder surrounding the receptacle are sufficiently rigid to retain engagement of the stud, but at the same time are sufficiently flexible that they will yield to disengage the stud when the stud driver is pried free. The inner surface of the receptacle may be roughened to provide better frictional engagement.

A BRIEF DESCRIPTION OF THE DRAWINGS

FIG. 1 is an end view of the stud driver embodying features of this invention;

FIG. 2 is a section view taken along line 2—2 of FIG. 1;

FIG. 3 and 4 are section views illustrating the operation of the stud driver.

DESCRIPTION OF A PREFERRED EMBODIMENT

Referring now to FIGS. 1 and 2 with greater particularity, the stud driver 10 of this invention is preferably formed of natural or synthetic rubber or similar resilient material. It may be of cylindrical configuration as shown, or it may be conical or otherwise taper in diameter toward the trailing end. In the leading end of the body 12 is a circular receptacle 14 of a diameter to fit snugly around a selected size stud. Secured in the opposite end of the body as by bonding or molding is a metalic coupling element 16 which may have a square, a hexagonal or a splined socket 18 adapted to receive a complementary male driving component of an air or electric wrench or other rotary driving device. Preferably for increased bonding strength, the outer surface 20 of the coupling element 16 is serrated or roughened. Similarly the inner surface 22 of the driving receptacle 22 may be roughened to increase its coefficient of friction.

The operation of the stud driver will become apparent from FIGS. 3 and 4 wherein it is desired to drive studs 24 and 26 into a metal plate 28. The stud driver 10 is mounted on the male coupling element 30 of an air or electric wrench (not shown). In operation, the stud driver 10 is placed over the end of a stud 26 and the drill is activated to rotate the stud driver, whereby firm frictional engagement of the receptacle 14 and stud, and particularly the end of the stud, threads the stud 26 into the tapped hole 34. The walls 32 of the stud driver surrounding the receptacle 14 are sufficiently thick and rigid that they will not yield unnecessarily but will grip the stud frictionally. However, as shown in FIG. 4, the walls 32 are sufficiently flexible that when the stud is fully driven the stud driver may be pried free of the stud 26. Hence, there is no need for reverse rotation of the drill and there is no risk of reverse threading the stud.

While this invention has been described in conjunction with the preferred embodiments thereof, it is obvious that modifications and changes therein may be made by those skilled in the art without departing from the spirit and scope of this invention.

What is claimed is:

1. A driver for a threaded stud comprising:

a thick-walled body of resilient material with a cylindrical receptacle therein of an internal diameter to fit snugly over a stud;

the walls surrounding said receptacle being sufficiently thick and rigid to engage a stud frictionally without stretching and with the inner surface of said receptacle engaging the end of the stud for driving frictionally, but sufficiently flexible to disengage said stud when said receptacle is pried therefrom, and a polygonal socket of rigid material adhered to said resilient material at the rear of said body and adapted for connection to a complementary element of a rotary driving member.

2. The stud driver defined by claim 1 wherein:

said inner surface of said receptacle is roughened to increase the coefficient of friction thereof.

* * * * *